Figure 1:
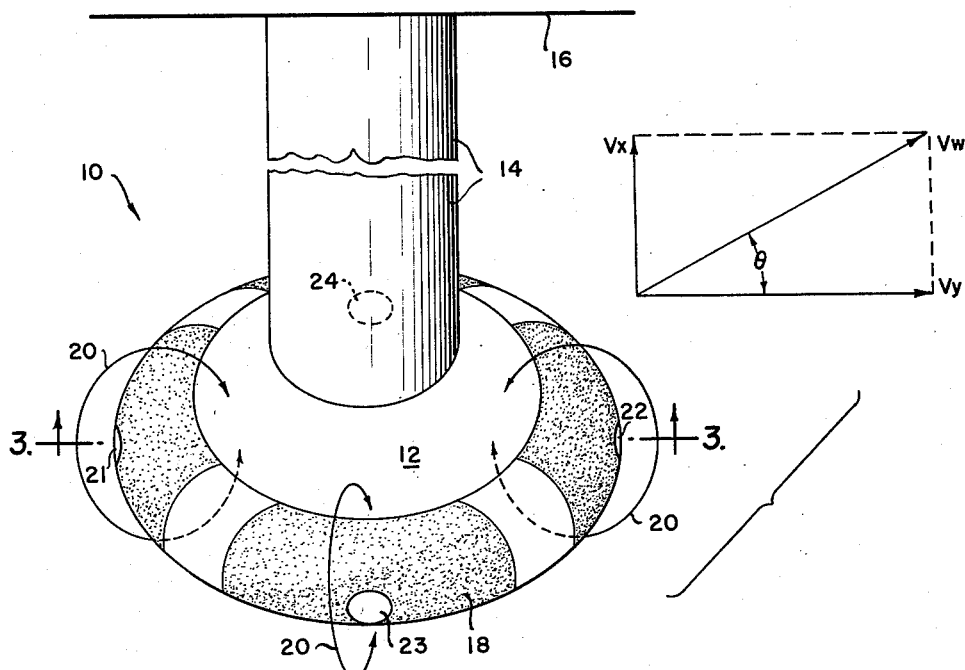

Dec. 15, 1964   L. W. GRISWOLD   3,161,047
OMNIDIRECTIONAL ELECTROMAGNETIC FLOWMETER
Filed May 27, 1960   4 Sheets-Sheet 1

INVENTOR
L. W. GRISWOLD
BY
ATTORNEYS

Dec. 15, 1964  L. W. GRISWOLD  3,161,047
OMNIDIRECTIONAL ELECTROMAGNETIC FLOWMETER
Filed May 27, 1960  4 Sheets-Sheet 2

INVENTOR
L. W. GRISWOLD

ATTORNEYS

Dec. 15, 1964 L. W. GRISWOLD 3,161,047
OMNIDIRECTIONAL ELECTROMAGNETIC FLOWMETER
Filed May 27, 1960 4 Sheets-Sheet 3

INVENTOR

L. W. GRISWOLD

BY

ATTORNEYS

Dec. 15, 1964   L. W. GRISWOLD   3,161,047
OMNIDIRECTIONAL ELECTROMAGNETIC FLOWMETER
Filed May 27, 1960   4 Sheets-Sheet 4

INVENTOR
L. W. GRISWOLD
BY
ATTORNEYS

United States Patent Office 3,161,047
Patented Dec. 15, 1964

3,161,047
OMNIDIRECTIONAL ELECTROMAGNETIC
FLOWMETER
Lyman William Griswold, Annapolis, Md., assignor to the United States of America as represented by the Secretary of the Navy
Filed May 27, 1960, Ser. No. 32,490
10 Claims. (Cl. 73—189)
(Granted under Title 35, U.S. Code (1952), sec. 266)

The invention described herein may be manufactured and used by or for the Government of the United States of America for governmental purposes without the payment of any royalties thereon or therefor.

This invention relates to an omnidirectional electromagnetic flowmeter for measuring the speed and direction of a conducting fluid, such as for oceanographic measurements.

In the past several flowmeter devices have been proposed which were not symmetrical either hydrodynamically, magnetically or electrically so that the speed and direction measurements were not linearly related to the water flow due to the non-symmetrical fluid flow and early onset of cavitation or excessive turbulence.

The direction measurement therefore could not be resolved by a simple trigonometric function through a wide range of speed and direction of relative water flow.

An object of the invention is to provide a flowmeter using electromagnetic induction in a moving, conducting liquid and voltage sensitive electrodes where the electrode outputs are linearly related to the components of velocity in the known directions.

A preferred embodiment of the invention employs an ellipsoidal sensing unit for measuring fluid flow in two dimensions where the transition from laminar to turbulent flow takes place at a very low speed while the cavitation speed is high enough to provide a useful velocity range. Cavitation manifests itself by affecting the conductivity of the moving liquid near the electrodes used to detect the induced voltage from the magnetic field.

Another embodiment of the invention employs a spherical sensing unit with additional means for measuring fluid velocity in three dimensions.

Another object of this invention is to disclose a flowmeter which will measure fluid flow in three dimensions without significant asymmetrical flow errors.

Figure 2:
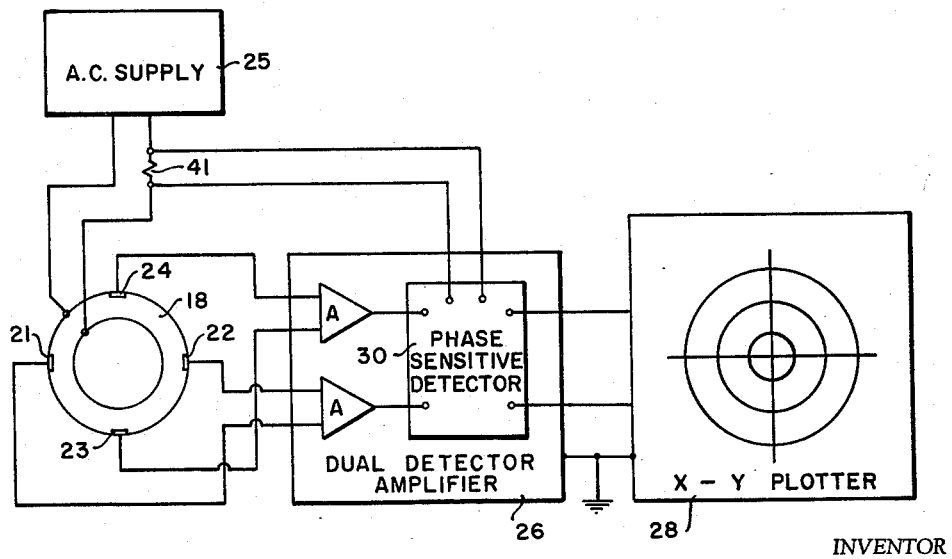
Figure 3:
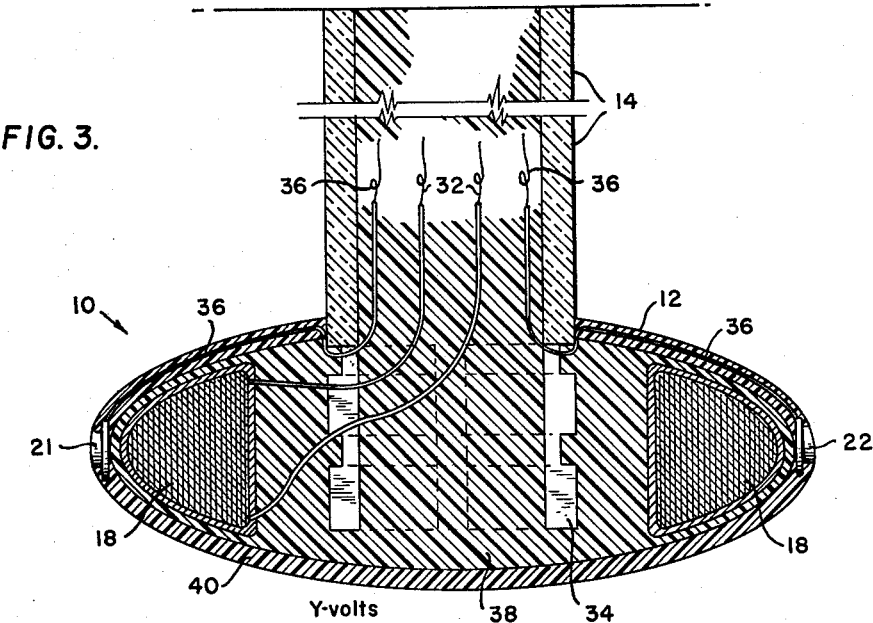
Figure 4:
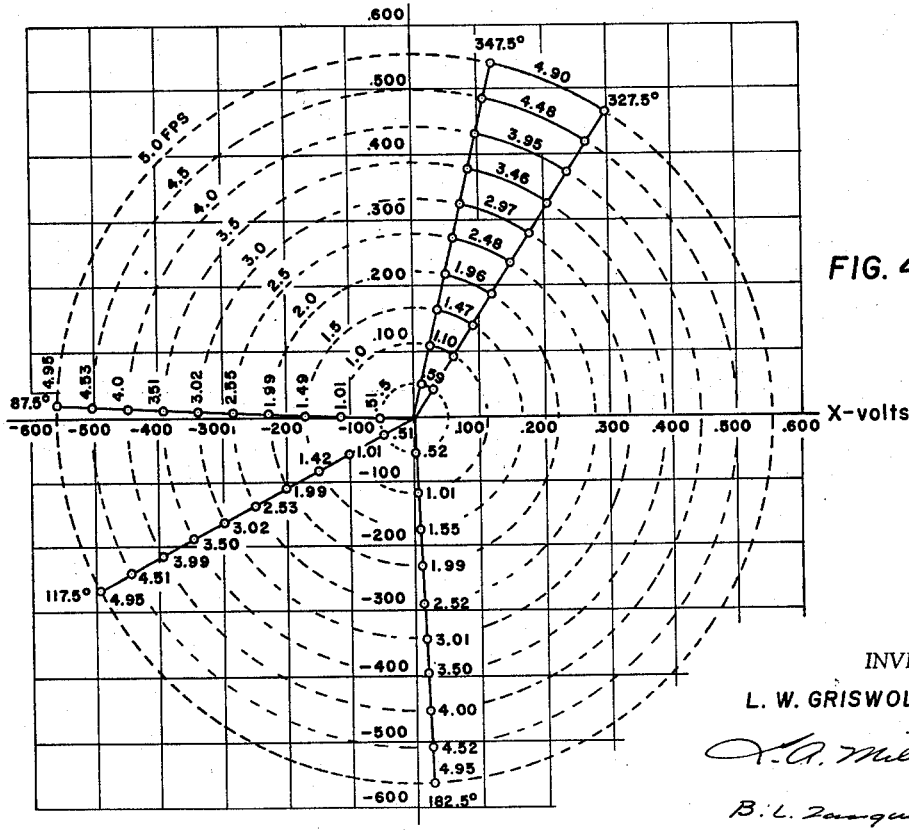
Figure 5:
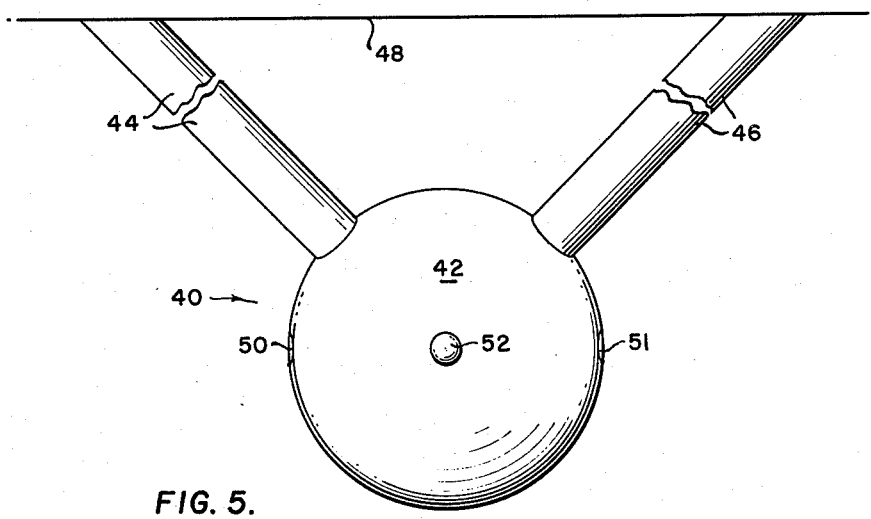
Figure 6:
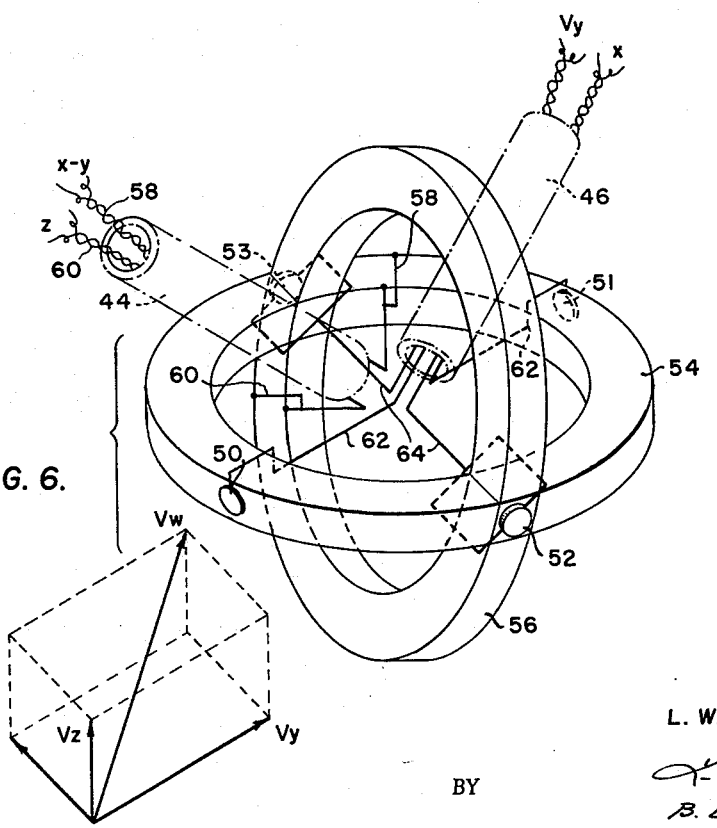
Figure 7:
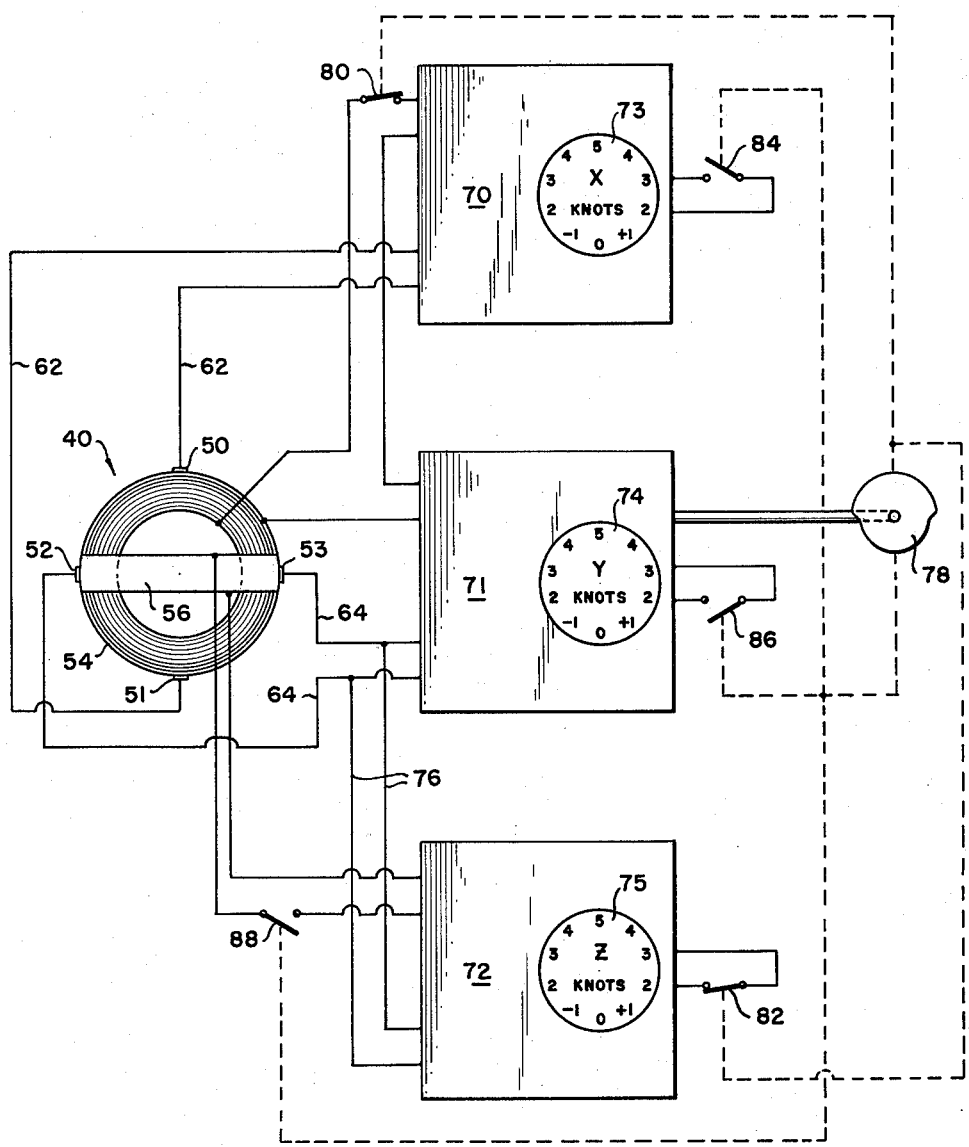

Other objects and many of the attendant advantages of this invention will be readily appreciated as the same becomes better understood by reference to the following detailed description when considered in connection with the accompanying drawings wherein:

FIG. 1 is a perspective view of the ellipsoidal flowmeter mounted beneath a ship hull;
FIG. 2 is a diagram of the measuring circuit for the ellipsoidal flowmeter;
FIG. 3 is a cross-sectional view to scale of the ellipsoidal flowmeter taken along lines 3—3 of FIG. 1;
FIG. 4 is a graph of the response of the ellipsoidal flowmeter;
FIG. 5 is an elevation view to scale of the spherical flowmeter;
FIG. 6 is a schematic view of the construction of the spherical flowmeter; and
FIG. 7 is a diagram of the measuring circuit for the spherical flowmeter.

Referring now to the drawings, there is shown in FIG. 1 the two dimensional flowmeter 10 including an oblate ellipsoidal casing 12 and a supporting tube 14 which extends two feet from a support such as a ship hull 16.

The casing 12 contains an electromagnetic coil 18 energized by an alternating current to project a symmetrical magnetic field into the surrounding fluid, as indicated by lines 20.

Four electrodes are mounted around the major diameter of the casing 12 every 90° and are designated the X electrodes 21 and 22 which are on one diameter and the Y electrodes 23 and 24 on a perpendicular diameter.

When a moving conducting fluid passes over the casing 12, an electric field is induced in the water perpendicular to the magnetic field 20. A resulting voltage is detected between the X electrodes 21 and 22 and another voltage is detected between the Y electrodes 23 and 24.

Since the voltage detected by each pair of X and Y electrodes is due to the fluid flow perpendicular to a line through the electrodes (X and Y axes), a fluid having a velocity $V_w$ is resolved into two velocity vectors $V_y$ and $V_x$ by reason of the 90° placement of the electrodes as indicated by the vector diagram of FIG. 1.

In order to measure the voltage detected by the electrodes and to display the correct direction and speed of the relative water flow, a measuring circuit as shown in FIG. 2 is provided.

As shown in FIG. 2, an A.C. voltage supply 25 energizes coil 18. The outputs of the X and Y electrodes are individually amplified in Dual Detector Amplifier 26 and the resultant plotted on X–Y plotter 28. A phase sensitive detector 30 associated with each amplifier detects only that portion of the amplified signal which is substantially in phase with the current in the coil and thus eliminates unwanted signals (primarily quadrature voltage induced by transformer action) which are not in phase with the speed-induced voltage.

Resistor 41 in series with coil 18 provides a reference voltage in phase with the current in coil 18 to detector 30 for quadrature voltage elimination.

Referring to FIG. 3, a cross-section of the flowmeter 10 taken along line 3—3 of FIG. 1 and drawn to scale is shown. Each coil 18 is made of 1060 turns of No. 22 magnet wire with twisted pair leads 32 extending up through tube 14. Tube 14 is a methyl methacrylate plastic sold under the trademark Plexiglas having a 2" O.D. and 1.5" I.D. Tube 14 has four vertical slots indicated in elevation at 34 for electrode leads 36 to pass through to electrodes 21–24 and for coil leads 32.

During assembly, coil 18, coil leads 32, electrode leads 36, and tube 14 are molded together with a casting resin 38, such as sold under the trademark Scotchcast 5. The electrode leads 36 are then carefully placed on radial lines away from the tube 14 to the electrode area. A second epoxy resin 40, such as sold under the trademark Eppocast 202, is then molded around the unit 12 and the electrode holes are carefully milled to allow bronze electrodes 21–24 to be inserted in the proper position and connected to the radial electrode leads 36. The electrodes and their leads are then sealed in place with an epoxy sealer, such as sold under the trademark Epoxylite 222, for complete waterproofing.

In a preferred embodiment, the casing 12 has a major diameter of 5.8" and a minor diameter of 2.3" with a 2.5 to 1 fineness ratio to provide a cavitation or excessive turbulent speed of over 12 knots.

The casing 12, being an ellipsoid of revolution presents the same hydrodynamic shape to any water flow in the XY plane so as to avoid all asymmetric flow errors. In a preferred embodiment, tube 14 has a relatively small 2" diameter as compared with the 5.8" diameter of the casing 12 and therefore does not create excessive turbulence within the effective speed range of the flowmeter 10 or cause asymmetric flow errors.

In the preferred embodiment of the measuring circuit of FIG. 2, a Dual Detector Amplifier, dwg. #41306, dated October 21, 1958, by Litton Industries, Inc., College Park, Md., incorporated amplifier 26 and phase detector circuit 30. The reference voltage was derived from a one ohm resistor 41 in series with the coil 18. The X–Y Plotter was a Model 210, by Librascope, Inc., Glendale, California.

The ellipsoidal flowmeter coil 18 with a 70 volt, .89 ampere, 70 cycle input, provided a 225 micro-volt/knot/ampere sensitivity at the electrodes.

FIG. 4 is a graph of the response of the ellipsoidal flowmeter with the rectangular coordinates in output volts from the amplifier 26 and with the concentric circles in measured feet per second. The experimental points (small solid circles) were taken at ½ foot per second values for water flow in the XY plane. Thus for a +.3 volt output from the X electrode amplifier and a +.46 volt output from the Y electrode amplifier the water flow will be 5 feet per second at an angle of 327.5°.

For this calibration curve the accuracy is ±.1 ft./sec. and ±2° in angular accuray at speeds of 1 ft./sec. or greater.

The excellent agreement between the measured feet per second values and the experimental points provided by the flowmeter show that the desired accuracy is obtained without detectable laminar to turbulent flow transition that would create non-linearities at low speeds and without the early onset of cavitation that would result in unstable and erroneous readings.

Referring to FIG. 5, a spherical flowmeter 40 is shown in elevation having a spherical casing 42, made of an epoxy resin sold under the trademark Eppocast 202, and a pair of plastic tubes 44 and 46, made of an epoxy resin reinforced with glass fibers, that extend about two feet upwards to a support 48, such as a ship hull.

Two X electrodes 50 and 51 and two YZ electrodes 52 and 53 are used to measure fluid flow in three dimensions from the magnetic fields projected from the casing 42.

The principle of operation of the spherical flowmeter 40 is generally similar to that of the ellipsoidal flowmeter 10, but, as is more clearly shown in schematic form in FIG. 6, the spherical flowmeter 40 has a different construction.

In FIG. 6 an XY coil 54 has the four electrodes 50–53 arranged around its periphery and a second Z coil 56 mounted at a right angle to and interleaved with XY coil 54 at the YZ electrodes 52 and 53. The XY coil 54 projects an alternating magnetic field into the surrounding fluid and the induced voltage due to the water flow is detected in the X and Y directions similar to the two dimensional flowmeter 10. The Z coil 56 projects a magnetic field into the moving fluid at a right angle to the field from XY coil 54 and the resultant induced voltage from the fluid flow is detected by the YZ electrodes 52 and 53 to produce an output voltage proportional to the flow in the Z direction. The vector diagram in FIG. 6 of the fluid flow illustrates how the vector velocity $Vw$ is resolved into three orthogonally related vectors $Vx$, $Vy$, and $Vz$.

In order to distinguish the Y and Z voltages on the YZ electrodes, such as when using the same frequency supply for the XY coil 54 and Z coil 56, and to minimize unwanted pickup, a time sharing system of alternately energizing the coils is shown on FIG. 7 with the measuring circuit.

Pickup is further minimized by bringing the XY coil power leads 58 and Z coil power leads 60 through one tube 44 and bringing the X electrode leads 62 and YZ electrode leads 64 through the other tube 46.

The leads 62 and 64 from the electrodes 50–53 should link as little magnetic flux as possible from the coils 54 and 56 and are therefore brought into the center of the spherical flowmeter 40 and then out to the electrodes over the coils.

The XY and Z coils are each made of 530 turns of .0008" by 1" copper strip having a .0001" thick insulation on one side. The turns are interleaved at the YZ electrode area and semi-circular .001" insulating strips are placed between the strip turns in the non-interleaved section to maintain the proper circular shape for the coils. A two ampere current at 29 volts and 70 cycles will provide about the same sensitivity as the two dimensional flowmeter 10.

The coils 54 and 56 and tubes 44 and 46 are molded together in one unit with an epoxy resin to provide a strong unitary structure and then the casing 42 is molded around the unit and electrodes 50–53 are mounted and sealed similar to the two dimensional flowmeter 10.

In a preferred embodiment, the spherical flowmeter 40 is 5.8" in diameter and tubes 44 and 46 are .75" in diameter. The relatively poor hydrodynamic shape of the spherical flowmeter 40 limits its maximum speed to about 6 knots for accurate measurements, but many hydrographic applications for three dimensional flow-measurements are at relatively low speeds within this range.

Referring to FIG. 7, the indicator system for the three dimensional flowmeter 40 is shown comprising three Underwater Log Equipment Electromagnetic Type Indicators 70, 71 and 72, dwg. #J–311–006F, by Litton Industries, Inc., College Park, Maryland. These indicators include a feedback nulling system, amplifiers, and speed indicating servo-motors to operate dials 73, 74, and 75 for the X, Y and Z directions, respectively.

X electrode leads 62 are connected to the X indicator 70, YZ electrode leads 64 are connected to the Y indicator 71, and an additional pair of leads 76 are connected from leads 64 to Z indicator 72.

In order to distinguish the Y and Z voltages, a 6 r.p.m. cam 78, driven by a timing motor in indicator 71, closes switch 80 to energize the XY coil 54, closes switch 82 to stop the servo-motor in Z indicator 72 to hold its reading, opens switches 84 and 86 to allow X and Y indicators 70 and 71 to indicate the X and Y direction flow, and opens switch 88 to de-energize the Z coil 56. On the next half revolution of cam 78, the alternate operation occurs and switches 80 and 82 are opened and switches 84, 86, and 88 are closed to stop the X and Y indicators 70 and 71, to energize Z coil 56, and to measure the Z direction flow as indicated on dial 75.

The speed of cam 78 may be increased if there is a rapid variation in the water flow rate or if a nearly continuous recording is required.

This voltage selection by time sharing switching is preferred because in most applications the avoidance of extraneous voltages is more important than continuous reading and indication. However, two different frequencies could be used to energize the XY and Z coils and bandpass filters could be used for selection in the electrode circuits as is well known in the art.

The three dimensional flowmeter 40 thus provides a highly accurate device for measuring fluid flow in three dimensions with only a negligible amount of flow disturbance by the supporting tubes.

Obviously many modifications and variations of the present invention are possible in the light of the above teachings. It is therefore to be understood that within the scope of the appended claims the invention may be practiced otherwise than as specifically described.

What is claimed is:

1. An omnidirectional electromagnetic flowmeter comprising an insulating plastic casing having an oblate ellipsoid shape and adapted to be placed in a conductive fluid to measure the relative fluid flow, an electromagnetic coil inside said casing in the same plane as the major diameter of said ellipsoid for projecting a symmetrical magnetic field around said casing, four electrodes mounted on the outer surface of said casing on the major diameter and spaced every 90° around said casing for deriving an output proportional to the fluid flow past said casing, a supporting plastic tube having a diameter smaller than said casing and attached by one end to the minor diameter of said casing and adapted to be attached by the other end to a support, an alternating current supply having a voltage output for energizing said coil through leads passing through said tube and casing, a dual detector amplifier having an input connected to said electrode output by connecting leads passing through said casing and tube, 90° phase shift means within said amplifier for shifting the phase of said supply voltage output and subtracting said phase shifted output from said amplified electrode output to eliminate quadrature voltages, and an XY plotter connected to said amplifier output for plotting the speed and direction of said fluid flow past said casing in the plane of said major diameter.

2. An omnidirectional electromagnetic flowmeter according to claim 1 and further characterized by said casing being made essentially of a waterproof epoxy resin.

3. An omnidirectional electromagnetic flowmeter comprising a spherical casing adapted to be placed within a conducting fluid, a first electromagnetic coil mounted within said casing for projecting a first symmetrical magnetic field around said casing, two X electrodes mounted on said casing on a first diameter of said coil for detecting a first voltage output induced by said first magnetic field in the fluid flow past said casing, two YZ electrodes mounted on said casing on a second diameter of said coil at a right angle to said first diameter for detecting a second voltage output induced by said first magnetic field in the fluid flow in the same plane as said coil and at an electrical right angle to said first voltage output, a second electromagnetic coil mounted within said casing at a right angle to and interleaved with said first coil on said second diameter near said XZ electrodes for projecting a second magnetic field around said casing whereby a third voltage output may be detected by said YZ electrodes at an electrical right angle to said first and second outputs induced by said second magnetic field in the fluid flow over said casing, a pair of tubes connected to said casing for mounting said casing from a support, indicator means electrically connected to said flowmeter through said tubes for energizing said coils and displaying the fluid flow speed detected by said electrodes, and cam and switch means connected to said indicator for sequentially energizing said coils whereby extraneous voltage pickup may be minimized.

4. An omnidirectional electromagnetic flowmeter comprising a casing adapted to be placed within a conducting fluid, at least four electrodes mounted on the outer surface of said casing, electromagnetic means mounted within said casing for projecting at least two magnetic fields around said electrodes and casing in such a manner that said magnetic fields have mutual components which lie in perpendicular planes and each of which said components is also perpendicular to an axis passing through two of said electrodes, and means connected to said electrodes for combining the outputs of said electrodes to produce an indication of the velocity and direction of flow of said fluid relative to said casing.

5. An omnidirectional electromagnetic flowmeter according to claim 4 and further characterized by said electromagnetic means additionally comprising at least two electrical coils mounted at right angles to each other, and means for electrically energizing said coils, whereby the vector velocity and direction of said fluid flow may be measured in a plane perpendicular to the axis of said electrodes.

6. An omnidirectional electromagnetic flowmeter according to claim 4 and further characterized by having said four electrodes mounted on said casing in a single plane and in quadrature to one another whereby the vector velocity and direction of said fluid flow in any plane may be measured.

7. An omnidirectional electromagnetic flowmeter comprising an insulating plastic casing having an oblate ellipsoid shape and adapted to be placed in a conductive fluid to measure the relative fluid flow, an electromagnetic coil inside said casing for projecting a symmetrical magnetic field around said casing, four electrodes mounted in known spaced relationship on the outer surface of said casing for deriving an output proportional to the fluid flow past said casing, a supporting plastic tube having a diameter smaller than said casing and attached by one end to the minor diameter of said casing and adapted to be attached by the other end to a support, an alternating current supply having a voltage output for energizing said coil through leads passing through said tube and casing, a dual detector amplifier having an input connected to the output of said electrodes by connection leads passing through said casing and tube, phase shift means for shifting the phase of said supply voltage output and subtracting the output of said electrodes to eliminate quadrature voltage, and means connected to the amplifier output for indicating the vector velocity and direction of flow of said fluid relative to said casing.

8. An omnidirectional electromagnetic flowmeter comprising an insulating plastic casing adapted to be placed in a conductive fluid to measure the relative fluid flow, a first electromagnetic coil inside said casing for projecting a symmetrical magnetic field around said casing, a second electromagnetic coil mounted at right angles to and interleaved with said first coil within said casing, four electrodes mounted in known spaced relationship on the outer surface of said casing for deriving an output proportional to the fluid flow past said casing, a supporting plastic tube having a diameter smaller than said casing and attached by one end to said casing and adapted to be attached by the other end to a support, an alternating current supply having a voltage output for energizing said first and second electromagnetic coil through leads passing through said tube and casing, a dual detector amplifier having an input connected to the output of said electrodes by connection leads passing through said casing and tube, phase shift means for shifting the phase of said supply voltage output and subtracting the output of said electrodes to eliminate quadrature voltage, and means connected to the amplifier output for indicating the vector velocity and direction of flow of said fluid relative to said casing.

9. An omnidirectional electromagnetic flowmeter according to claim 8 and further characterized by said casing having a spherical shape.

10. An omnidirectional electromagnetic flowmeter according to claim 4 and further characterized by said casing having a pair of tubes extending therefrom for attachment to a support.

References Cited by the Examiner
UNITED STATES PATENTS

| | | | |
|---|---|---|---|
| 2,729,103 | 1/56 | Raynsford et al. | 73—194 |
| 2,969,673 | 1/61 | Snyder et al | 73—194 |
| 3,110,876 | 11/63 | Ramey et al. | 73—194 |

OTHER REFERENCES

Article entitled—"The Measurement of Sea-Water Velocities by Electromagnetic Induction," by R. W. Guelke et al., The Journal of The Institution of Electrical Engineers, volume 94, parts 2 and 3, pub. date 1947, pages 71–74.

RICHARD C. QUEISSER, *Primary Examiner.*

A. CUTTING, *Examiner.*